United States Patent [19]

Hamaker

[11] 4,367,031

[45] Jan. 4, 1983

[54] EDGE GUIDE FOR BELT TRACKING

[75] Inventor: Ralph A. Hamaker, Penfield, N.Y.

[73] Assignee: Xerox Corporation, Stamford, Conn.

[21] Appl. No.: 168,938

[22] Filed: Jul. 11, 1980

[51] Int. Cl.[3] ...................... G03G 15/00; B65G 39/16

[52] U.S. Cl. ................................ 355/3 BE; 198/806; 198/840; 355/16

[58] Field of Search ...................... 355/3 R, 3 BE, 16; 198/806, 840

[56] References Cited

U.S. PATENT DOCUMENTS

| | | | |
|---|---|---|---|
| 3,604,797 | 9/1971 | Szczesniak | 355/16 |
| 3,698,540 | 10/1972 | Jordan | 198/202 |
| 3,702,131 | 11/1972 | Stokes et al. | 198/202 |
| 3,796,488 | 3/1974 | Tanaka et al. | 355/16 |
| 3,818,391 | 6/1974 | Jordon et al. | 355/3 R |
| 3,846,021 | 11/1974 | Vola | 355/16 |
| 3,974,952 | 8/1976 | Swanke et al. | 226/189 |
| 4,068,937 | 1/1978 | Willemse et al. | 355/16 X |
| 4,174,171 | 11/1979 | Hamaker et al. | 355/3 BE |
| 4,178,094 | 12/1979 | Silverberg | 355/16 |

OTHER PUBLICATIONS

Morse, J. E.; "Web Edge Guide"; Research Disclosure; No. 191, Mar. 1980; p. 129; Article No. 19160.

*Primary Examiner*—Fred L. Braun

*Attorney, Agent, or Firm*—H. Fleischer; H. M. Brownrout

[57] ABSTRACT

An apparatus which maintains a moving belt in lateral alignment. The belt is supported so as to form an arcuate region therein. A guide engages the side edge of the belt in the arcuate region to prevent lateral movement thereof.

5 Claims, 4 Drawing Figures

EDGE GUIDE FOR BELT TRACKING

This invention relates generally to an electrophotographic printing machine, and more particularly concerns an improved apparatus for maintaining a moving belt in lateral alignment.

In the process of electrophotographic printing, a photoconductive belt is charged to a substantially uniform potential so as to sensitize the surface thereof. The charged portion of the photoconductive belt is exposed to a light image of an original document being reproduced. Exposure of the charged photoconductive belt selectively dissipates the charge thereon in the irradiated areas. This records an electrostatic latent image on the photoconductive belt corresponding to the informational areas contained within the original document. After the electrostatic latent image is recorded on the photoconductive belt, the latent image is developed by bringing a developer mixture into contact therewith. Generally, the developer mixture comprises toner particles adhering triboelectrically to magnetic carrier granules. The toner particles are attracted from the carrier granules to the latent image forming a toner powder image on the photoconductive belt. The toner powder image is then transferred from the photoconductive belt to a copy sheet. Finally, the copy sheet is heated to permanently affix the toner particles thereto in image configuration.

Inasmuch as the photoconductive belt moves through numerous processing stations during the printing operation, lateral alignment thereof is critical and must be controlled within prescribed tolerances. As the belt passes through each of these processing stations, the location of the latent image must be precisely defined in order to optimize the operations relative to one another. If the position of the latent image deviates from processing station to processing station, copy quality may be significantly degraded. Hence, lateral movement of the photoconductive belt must be minimized to insure that the belt moves in a pre-determined path.

Similarly, document handling systems frequently employ belts to transport original documents to and from the exposure station. The lateral alignment of the belts used in document handling systems must also be controlled in order to insure the correct positioning of successive original documents relative in the optical system of the exposure station.

Ideally, if the belt were perfectly constructed and entrained about perfectly cylindrical rollers secured in an exactly parallel relationship with one another, the velocity vector of the belt would be substantially normal to the longitudinal axis of the roller. Under these circumstances, there would be no lateral translation of the belt. However, in actual practice, this is not feasible. Frequently, the velocity vector of the belt approaches the longitudinal axis of the roller at an angle. This produces lateral movement of the belt relative to the roller. Thus, the belt must be tracked or controlled to regulate its lateral position. Hereinbefore, lateral movement of a belt has been controlled by crowned rollers, flanged rollers or servo systems. Rollers of this type frequently produce high local stresses resulting in damage to the edges of the belt. Servo systems using steering rollers to maintain lateral control of the belt generally apply less stress to the sides thereof. However, servo systems of this type are frequently rather complex and costly.

Various attempts have been made to develop simple and low cost control systems. The following art appears to disclose relevant devices which maintain a moving belt in lateral alignment:

U.S. Pat. No. 3,435,693
Patentee: Wright et al.
Issued: Apr. 1, 1969

U.S. Pat. No. 3,500,694
Patentee: Jones et al.
Issued: Mar. 17, 1970

U.S. Pat. No. 3,540,571
Patentee: Morse
Issued: Nov. 17, 1970

U.S. Pat. No. 3,698,540
Patentee: Jordan
Issued: Oct. 17, 1972

U.S. Pat. No. 3,702,131
Patentee: Stokes et al.
Issued: Nov. 17, 1972

U.S. Pat. No. 3,818,391
Patentee: Jordon et al.
Issued: June 18, 1974

Research Disclosure Journal May, 9, 1976
Author: Morse et al. No. 14510, Page 29

The pertinent portions of the foregoing disclosures may be briefly summarized as follows:

Wright et al. describes a belt entrained about a plurality of spaced rollers. One end of the rollers is journaled in a pivotable frame. A sensing member is forced to the right by the lateral movement of the belt. The sensing member is connected by a linkage to the frame. If the belt is forced against the sensing member, the linkage rotates the frame to a position where the belt will track away from the sensing member until equilibrium is achieved.

Jones et al. discloses a belt tracking system in which a sensing finger detects lateral movement of the belt and actuates a control motor. The control motor rotates a cam shaft which in turn, rotates a camming mechanism to pivot a steering roller so as to return the belt to the desired path of travel.

Morse discloses a belt tracking system having a washer journaled loosely on a steering roller shaft. A pressure roller contacts the washer. The pressure roller is mounted on a pivotable rod and connected pivotably to a servo arm. The servo arm is connected pivotably to the frame. Horizontal motion of the belt causes the pressure roller to move horizontally. This moves the servo arm vertically pivoting the steering roller to restore the belt to the desired path.

Jordan, Stokes et al. and Jordon et al., all describe a belt steering apparatus employing a disc mounted loosely on one end of a belt support roller. The disc is connected to a linkage which pivots one of the other support rollers. Lateral movement of the belt causes the discs to translate pivoting the linkage. The linkage pivots the other support roller returning the belt to the pre-determined path of movement.

Morse et al. discloses a passive web tracking system. The web is supported in a closed loop path by a plurality of supports. The supports include a first roller. The first roller is pivotably mounted to align its axis of rotation to the normal direction of travel of the web. Fixed flanges engage the side edge of the web preventing lateral movement thereof. A second roller, spaced from the first roller, is supported at its mid-point by a self-aligning radial ball bearing. A yoke supports the second roller pivotably. Movement of the roller is limited to rotation about a castering axis and a gimble axis by a flex arm. This permits the web to change direction providing uniform tension in the web span.

In accordance with the features of the present invention, there is provided an apparatus for maintaining a moving belt in lateral alignment. The apparatus includes means for supporting the belt so as to form an arcuate region therein. Means engage the side edge of the belt in the arcuate region to prevent lateral movement thereof.

Other aspects of the invention will become apparent as the following description proceeds and upon reference to the drawings, in which.

While the present invention will hereinafter be described in connection with the preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
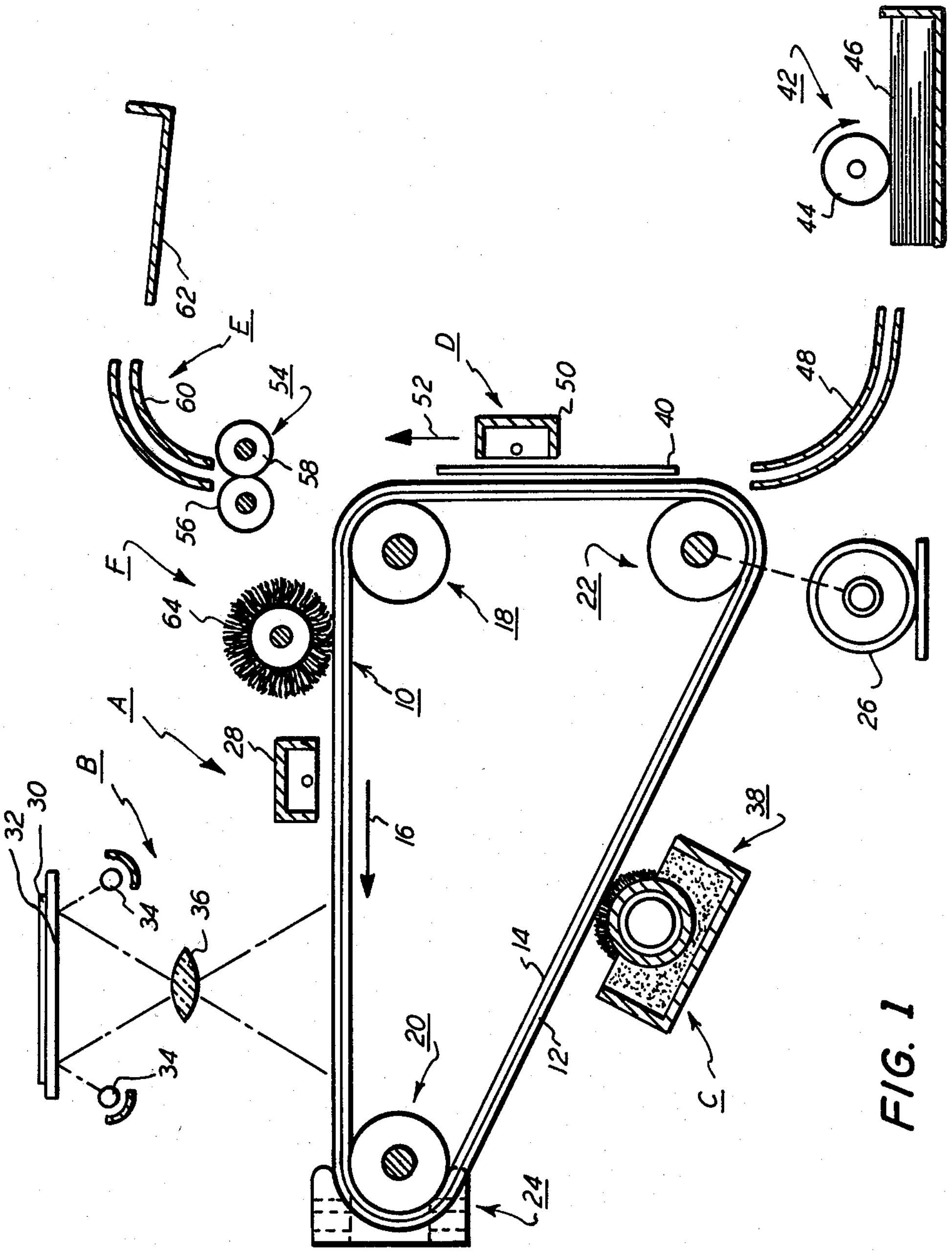
FIG. 1 is a schematic elevational view depicting an electrophotographic printing machine incorporating the features of the present invention therein.

For a general understanding of the features of the present invention, reference is made to the drawings. In the drawings, like reference numerals have been used throughout to indicate identical elements. FIG. 1 schematically depicts the various components of an illustrative electrophotographic printing machine incorporating the belt support and edge guide of the present invention therein. Although the belt support and edge guide are particularly well adapted for use in an electrophotographic printing machine, it will become evident from the following discussion that it is equally well suited for use in a wide variety of devices and is not necessarily limited in its application to the particular embodiment shown herein.

Inasmuch as the art of electrophotographic printing is well known, the various processing stations employed in the FIG. 1 printing machine will be shown hereinafter schematically and their operation described briefly with reference thereto.

As shown in FIG. 1, the electrophotographic printing machine employs a belt 10 having a photoconductive surface 12 deposited on a conductive substrate 14. Preferably, photoconductive surface 12 is made from a selenium alloy with conductive substrate 14 being made from an aluminum alloy. Belt 10 moves in the direction of arrow 16 to advance successive portions of photoconductive surface 12 sequentially through the various processing stations disposed about the path of movement thereof. Belt 10 is entrained about stripping roller 18, guide roller 20 and drive roller 22. Stripping roller 18 is mounted rotatably so as to rotate with the movement of belt 10. Guide roller 20 is resiliently urged into engagement with belt 10. This mantains belt 10 under the desired tension. Guide roller 20 includes a c-shaped flange 24 arranged to engage the portion of belt 10 wrapped around roller 20 on the side edge thereof so as to prevent lateral movement of belt 10. The detailed structure of guide roller 20 and the associate flange 24 will be shown hereinafter with reference to FIGS. 2 through 4, inclusive. Drive roller 22 is rotated by motor 26 coupled thereto by suitable means, such as a drive belt. As roller 22 rotates, it advances belt 10 in the direction of arrow 16.

With continued reference to FIG. 1, initially a portion of belt 10 advances through charging station A. At charging station A, a corona generating device, indicated generally by the reference numeral 28, charges photoconductive surface 12 to a relatively high, substantially uniform potential.

Thereafter, the charged portion of photoconductive surface 12 passes through exposure station B. At exposure station B, an original document 30 is positioned face-down on transparent platen 32. Lamps 34 flash light rays onto the original document. The light rays reflected from the original document are transmitted through lens 36 forming a light image thereof. Lens 36 focuses the light image onto the charged portion of photoconductive surface 12. The charged photoconductive surface is discharged by the light image of the original document to record an electrostatic latent image on photoconductive surface 12. The latent image recorded on photoconductive surface 12 corresponds to the informational areas contained in original document 30.

Next, drum 10 advances the electrostatic latent image recorded on photoconductive surface 12 to development station C. At development station C, a magnetic brush development system, indicated generally by the reference numeral 38, transports the developer mixture into contact with the electrostatic latent image recorded on photoconductive surface 12 of belt 10. Preferably, the developer mixture comprises carrier granules having toner particles adhering triboelectrically thereto. The development system forms a brush having a chain-like array of developer material extending outwardly therefrom. This developer mixture contacts the electrostatic latent image recorded on the photoconductive surface of drum 10. The latent image attracts the toner particles from the carrier granules forming a toner powder image on photoconductive surface 12.

The toner powder image developed on photoconductive surface 12 of belt 10 is then advanced to transfer station D. At transfer station D, a sheet of support material 40 is positioned in contact with the toner powder image deposited on photoconductive surface 12. The sheet of support material is forwarded to transfer station D by a sheet feeding apparatus, indicated generally by the reference numeral 42. Preferably, sheet feeding apparatus 42 includes a feed roll 44 contacting the uppermost sheet of the stack 46 of sheets of support material. Feed roll 44 rotates so as to advance the uppermost sheet from stack 46. The sheet moves from stack 46 into chute 48. Chute 48 directs the sheet of support material into contact with photoconductive surface 12 of belt 10 in a timed sequence so that the powder image developed thereon contacts the advancing sheet of support material at transfer station D.

Transfer station D includes a corona generating device 50 which applies a spray of ions onto the backside of sheet 40. This attracts the toner powder image from photoconductive surface 12 to sheet 40. After transfer, the sheet continues to move in the direction of arrow 52. A detack corona generating device (not shown) neutralizes the charge causing sheet 40 to adhere to belt 10. A conveyor system (not shown) advances sheet 40 from belt 10 to fusing station E.

Fusing station E includes a fuser assembly, indicated generally by the reference numeral 54, which permanently affixes the transferred toner powder image to sheet 40. Preferably, fuser assembly 54 includes a heated fuser roller 56 and a back-up roller 58. Sheet 40 passes between fuser roller 56 and back-up roller 58 with the toner powder image contacting fuser roller 56. In this manner, the toner powder image is permanently affixed to sheet 40. After fusing, chute 60 guides the advancing sheet 40 to catch tray 62 for subsequent removal from the printing machine by the operator.

Invariably, after the sheet of support material is separated from photoconductive surface 12, some residual toner particles remain adhering thereto. These residual toner particles are cleaned from photoconductive surface 12 at cleaning station F. Preferably, cleaning station F includes a rotatably mounted fibrous brush 64 in contact with photoconductive surface 12 of belt 10. The particles are cleaned from photoconductive surface 12 by the rotation of brush 64 in contact therewith. Subsequent to cleaning, a discharge lamp (not shown) floods photoconductive surface 12 with light to dissipate any residual electrostatic charge remaining thereon prior to the charging thereof for the next successive imaging cycle.

It is believed that the foregoing description is sufficient for purposes of the present invention to illustrate the general operation of an electrophotographic printing machine incorporating the features of the present invention therein.

Figure 2:
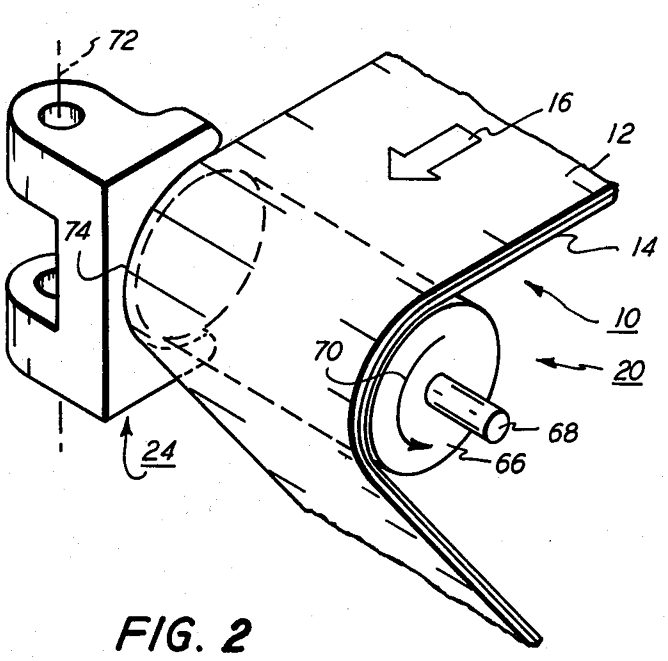
FIG. 2 is a perspective view showing the guide controlling lateral belt movement in the FIG. 1 printing machine.

Turning now to the specific subject matter of the present invention, FIG. 2 depicts a perspective view of guide roller 20. As shown thereat, guide roller 20 includes tubular member 66 mounted rotatably on shaft 68. Belt 10 moves in the direction of arrow 16 so as to rotate tubular member 66 about shaft 68 in the direction of arrow 70. Flange 24 is mounted stationarily and arranged to pivot about axis 72. Axis 72 is substantially normal to the longitudinal axis of shaft 68. Interior portion 74 of flange 24, is c-shaped and positioned to engage the side edge of belt 10 in the arcuate portion thereof, i.e. after a line tangent to tubular member 66 at the initiation of belt wrap thereabout. In this section, belt 10 is curved and has a much higher buckling strength then when flat. Flange 24 is arranged to pivot around axis 72 so as to tilt as belt 10 pivots. In this way, flange 24 is continuously in engagement with the entire arcuate portion of belt 10. The edge force of belt 10 on flange 72 produces the pivoting movement of flange 24 about axis 72. By way of example, belt 10 wraps around tubular member 66 about 180°. Under these circumstances, the c-shaped interior portion 74 of flange 24 extends through an included angle of substantially about 180°. Thus, interior portion 74 is c-shaped with the included angle of the interior portion corresponding to the angle that belt 10 is wrapped about tubular member 66. In this manner, flange 24 engages the arcuate portion of belt 10 on the side edge thereof. This insures that a maximum buckling load can be sustained by belt 10 minimizing the likelihood of failure thereof. By using a c-shaped flange, the belt edge guiding forces occur only around the belt wrap angle, thereby confining the buckling forces to the largest section modules. Since the flange is stationary, i.e. nonrotating, there are no lift forces to the belt edge. This prevents the belt from climbing up the flange.

Figure 3:
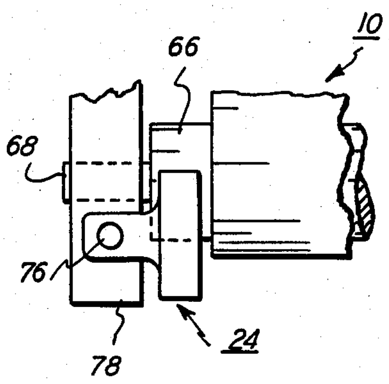
FIG. 3 is the fragmentary, plan view illustrating the FIG. 2 guide.

Referring now to FIG. 3, there is shown flange 24 in greater detail. As depicted thereat, flange 24 is mounted pivotably on pin 76 which is secured to frame 78 of the printing machine.

Figure 4:
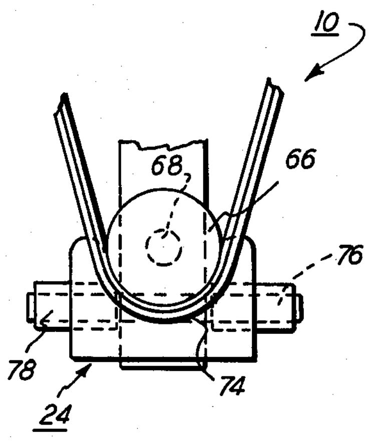
FIG. 4 is a fragmentary, elevational view depicting the FIG. 2 guide.

Turning now to FIG. 4, there is shown a side elevational view of flange 24. As depicted thereat, flange 24 is mounted pivotably on pin 76. Pin 76 is connected to frame 78 of the printing machine. Interior portion 74 of flange 24 is c-shaped and extends over an included angle of about 180°. In this way, interior portion 74 engages the side edge of belt 10 over the portion thereof that is wrapped around tubular member 66. One skilled in the art will appreciate that the wrap angle may vary and need not necessarily be 180°. However, the included angle of the interior portion 74 of flange 24 should correspond to the wrap angle. This insures that belt 10 does not buckle due to the lateral movement thereof, i.e. when the side edge of belt 10 moves into engagement with flange 24. This is due to the fact that the buckling forces required to produce failure are much greater over an arcuate region than in a flat region.

While the present invention has been described as maintaining a moving photoconductive belt in lateral alignment, one skilled in the art will appreciate that the belt support and guide may equally be well employed in a document handling system.

In recapitulation, it is evident that the apparatus of the present invention prevents lateral movement of the belt and provides support therefore. Lateral movement is prevented by a stationary side guide or flange arranged to pivot so as to be in continuous contact with the arcuate portion of the belt. This significantly increases the buckling loads required to produce failure of the belt. Any lateral movement of the belt causes the flange to pivot so as to be in continuous contact with the entire side edge and to provide a restraining force maintaining the belt in the desired path of travel.

It is, therefore, evident that there has been provided in accordance with the present invention, an apparatus for suppporting a moving belt and preventing lateral movement thereof so that the belt moves in a predetermined path. This apparatus fully satisfies the aims and advantages hereinbefore set forth. While this invention has been described in conjunction with a specific embodiment thereof, it will be evident that many alternatives, modifications and variations will be apparent to those skilled in the art. Accordingly, it is intended to embrace all such alternatives, modifications and variations as fall within the spirit and broad scope of the appended claims.

What is claimed is:

1. An electrophotographic printing machine of the type having a photoconductive belt arranged to move in a predetermined path through a plurality of processing stations disposed therealong, wherein the improvement includes:

means for supporting the photoconductive belt so as to form an arcuate region therein;

means for engaging the side edge of the photoconductive belt in the arcuate region, said engaging means applying a force on the side edge of the belt sufficient to prevent lateral movement thereof and maintain the belt in the predetermined path; and means for pivotably holding said engaging means so that the side edge of the photoconductive belt pivots said engaging means relative to and independent of said supporting means so as to be in contact with substantially the entire side edge of the belt in the arcuate region thereof.

2. A printing machine according to claim 1, wherein said supporting means includes an elongated roller having the photocoductive belt passing thereover to form the arcuate region therein.

3. A printing machine according to claim 2, wherein said engaging means includes a c-shaped flange, said holding means supporting said flange at one end of said roller so that said flange pivots about an axis substantially normal to the longitudinal axis of said roller.

4. A printing machine according to claim 3, wherein said flange contacts the side edge of the photoconductive belt over the portion thereof wrapped around said roller.

5. A printing machine according to claim 4, wherein the flange contacts the side edge of the photoconductive belt over an angular region of about 180°.

* * * * *